United States Patent

[11] 3,573,883

| [72] | Inventor | Jean Georges Cadiou<br>Paris, France |
|---|---|---|
| [21] | Appl. No. | 779,661 |
| [22] | Filed | Nov. 27, 1968 |
| [45] | Patented | Apr. 6, 1971 |
| [73] | Assignee | Societe Anonyme Automobiles Citroen<br>Paris, France |
| [32] | Priority | Dec. 7, 1967 |
| [33] | | France |
| [31] | | 131,384 |

[54] DEVICES FOR THE VERTICAL ADJUSTMENT OF THE BODIES OF AUTOMOTIVE OR OTHER VEHICLES
3 Claims, 4 Drawing Figs.

[52] U.S. Cl..................................................... 280/124, 280/6

[51] Int. Cl....................................................... B60g 17/00
[50] Field of Search............................................ 280/6, 6.1, 6 (H), 124 (F)

[56] References Cited
UNITED STATES PATENTS
3,404,899  10/1968  Vogel........................... 280/6

Primary Examiner—Philip Goodman
Attorney—Wenderoth, Lind & Ponack

ABSTRACT: An adjustment valve for a vertical adjustment device of automotive or other vehicles comprising at the front and rear ends suspensions provided with vertical correctors and accumulators supplied with fluid under pressure by means of a distributor under pressure connected to said valve comprising a slide-valve piston and communicating with a fluid reservoir.

PATENTED APR 6 1971
3,573,883
FIG.1 FIG.2
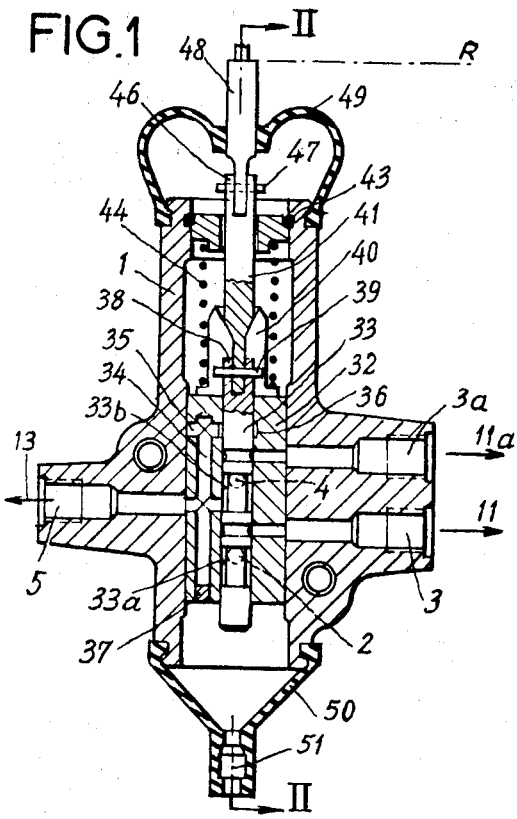
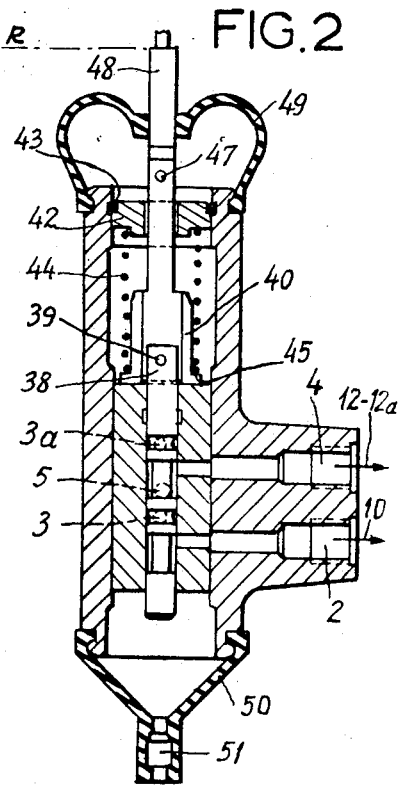
FIG.3 FIG.4
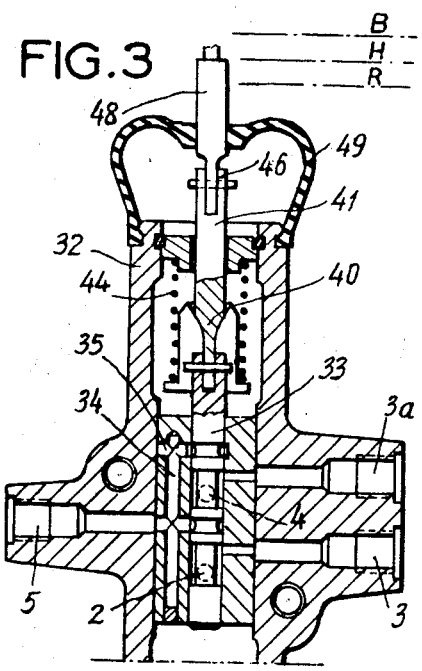
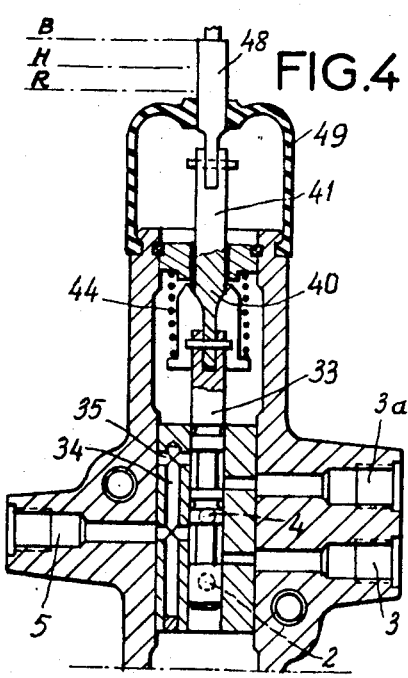
JEAN GEORGES CADIOU, Inventor
By Wenderoth, Lind & Ponack
Attorneys

DEVICES FOR THE VERTICAL ADJUSTMENT OF THE BODIES OF AUTOMOTIVE OR OTHER VEHICLES

The present invention relates to an adjustment valve for vertical adjustment devices of automotive or other vehicles, notably of the type wherein the suspension system provided with vertical corrector means is supplied with fluid under pressure from a distributor under pressure.

Adjustment valves of this general type are already known, notably those described and illustrated in the U.S. Pat. No. 3,445,122 to Georges Cadiou, which comprise a slide-valve piston adapted in its normal or so-called road position to isolate the suspension by causing the return ports of the vertical correctors to communicate with a fluid reservoir, said slide-valve piston, when in its upper position, connecting the vehicle suspension directly with the distributor of fluid under pressure and, when in its lower position, connecting said suspension to the fluid reservoir.

With an adjustment device comprising this known valve type, to change from the normal or road position of the valve, wherein the suspension system is supplied with fluid under pressure through corrector means, to the upper position, in which the suspension is connected directly to the supply of fluid under high pressure while bypassing said corrector means, it is necessary to clear the lower valve position in which the suspension is isolated from the supply of fluid under high pressure and connected to the fluid reservoir under atmospheric pressure.

As result, during the operation a momentary reduction in the height or ground clearance of the vehicle takes place and must firstly be corrected before attaining the selected upper position.

Besides, when the manual control selector sets this upper position in which the accumulators of the front suspension and of the rear suspension are connected in parallel to the supply of fluid under high pressure, a sudden pressure equalization between the front accumulators and the rear accumulators takes place. The front accumulators, of which the pressure in the "road" position of the device is higher than that of the rear accumulators, will discharge themselves into the rear accumulators, thus bringing about a temporary reduction in the height of the front portion of the vehicle body. This reduction is rapidly corrected by the supply of fluid under high pressure, but nevertheless it is rather misleading or confusing.

It is the object of this invention to provide a valve of the type set forth which is free of the inconveniences disclosed hereinabove and characterized essentially in that the position of its slide-valve piston, in the upper position of the vehicle suspension, lies above the slide-valve piston position in the road position of the suspension the passage from the "road" position to the "upper" position taking place directly.

This invention will be better understood from the following description referring to a specific form of embodiment thereof illustrated diagrammatically in the attached drawing, in which:

FIG. 1 illustrates in vertical axial section taken along the line I-I of FIG. 2 the valve according to this invention, the slide-valve piston being shown in its "road" position;

FIG. 2 illustrates the same valve in vertical axial section but taken along the line II-II of FIG. 1;

FIG. 3 illustrates the valve of FIG. 1, the slide-valve piston being shown in the position corresponding to the "upper" position of the suspension; and FIG. 4 illustrates the same valve, with the slide-valve piston shown in the position corresponding to the "lower" position of the suspension.

Referring to FIGS. 1 and 2, it will be seen that the valve according to this invention consists of a body 1 containing a cylindrical jacket 32 rigid therewith and formed with an axial bore slidably engaged by a slide-valve piston 33. This body 1 has formed therein transverse ports having their axes disposed in two longitudinal perpendicular planes and formed with extensions through the wall of said jacket 32 so as to open into the bore thereof, as shown. The ports 3, 3a and 5 lie in the plane of FIG. 1, port 5 being connected to the fluid reservoir 13 and being opposite to the other ports 3 and 3a (connected to the suspension devices 11 and 11a of the front and rear axles of the vehicles, respectively, with respect to the longitudinal geometric axis of the cylinder). This port 5 also communicates via a longitudinal passage 34 and a transverse passage 35 formed in said jacket 32 with a groove 36 formed in the upper portion of the jacket. A plug 37 seals the free end of passage 34. In the second plane, shown in FIG. 2, ports 2 and 4 formed in the body 1 open likewise through the jacket wall into the jacket bore, the first one beneath the port 3 and the other one between the aforesaid ports 5 and 3a. These ports 2 and 4 are connected to the pressure fluid distributor 10 and to the return ports of the height correctors 12 and 12a of the suspension systems respectively.

The slide valve 33 comprises two portions of smaller diameter 33a and 33b; the strap-shaped end portion of the slide valve emerges from cylinder 1 and is connected through a pivot pin 39 to a member 40 formed with a sliding rod 41 extending through a sealing plug 42 and retained by a circlip 43; this plug 42 acts as a reaction member to one end of a coil compression spring 44 bearing with its opposite end against a shoulder 45 of member 40. The strap-shaped end 46 of rod 41 is connected through a pivot pin 47 to a control rod 48 connected in turn to the valve selector mechanism. A flexible or deformable cap 49 encloses the upper portions of body 1 and rod 47 for protecting and sealing same. Another flexible cap 50 encloses the lower portion of body 1 and is formed with an orifice 51 permitting the discharge of any valve leakage fluid to the reservoir.

The valve according to this invention operates as follows:

In the normal, so-called "road" position of the slide-valve piston, which is illustrated in FIGS. 1 and 2, the slide valve 33 closes the ports 3 and 3a and isolates the port 2. On the other hand, the portion 33b of minor diameter of this slide valve permits the fluid communication between the port 4 leading to the return line of the suspension vertical correctors and the port 5 leading to the reservoir. Then the pressure in the suspension members is dependent on the operation of said correctors.

When it is desired to change from the normal road position, in which the rod 48 of slide valve 33 is at level R, to the upper position of the suspension, the selector hand lever (not shown in the drawing) is rotated to move the rod upwards to position H corresponding to the upper position of the suspension system, this position H lying just above the R (road) position. Under these conditions, the slide valve 33 will move to the position shown in FIG. 3, in which port 3 connected to the front suspension accumulators 11 communicates through the small-diameter portion 33a of the slide valve with the port 2 connected in turn to the pressure fluid distributor, and the port 3a connected to the rear suspension accumulators communicates via the small-diameter portion 33b of the slide valve with the port 4 connected in turn to the return line of the vertical correctors 12, 12a. Thus, the fluid under pressure is fed directly via port 3 to the front suspension accumulators 11. When the front detector 12 receives the information about the raising of the vehicle body, he puts the accumulator 11 in communication with its return circuit, and the front suspension accumulators then supply via ports 4 and 3a the rear suspension accumulators 11a. The rear detector 12a puts then the rear suspension accumulators 11a in communication with its return circuit. The rear accumulators are thus supplied in parallel by the two circuits, thus avoiding the transfer of all fluid pressure from the front suspension to the rear suspension when changing to the upper position.

When it is desired to change to the lower position of the suspension, which corresponds to position B of rod 48 of slide valve 33, the selector hand lever is rotated in the proper direction. Thus, port 2 is closed by the lower portion of the slide valve and port 4 is closed by the central portion thereof; ports 3 and 5 are interconnected by the small-diameter portion 33a and port 3a is connected to port 5 through the small-diameter portion 33b, groove 36 and orifices 35 and 34.

The suspension accumulators are thus connected to the fluid reservoir and will be discharged, thus lowering the vehicle body.

I claim:

1. A device for the vertical adjustment of the body of an automotive or other vehicle comprising in combination a suspension system with front and rear suspension elements having return ports and controlled by fluid under pressure, a pressure fluid distributor, a fluid reservoir, vertical correcting means connected to said suspension elements and to said distributor and having return ports associated with said suspension elements, and a fluid valve having a body with ports connected respectively to said front and rear suspension elements, fluid reservoir, vertical correcting means and fluid distributor, a body with a jacket and in a bore of the jacket a sliding member with two portions of a diameter smaller than the diameter of the sliding portions of the member, for connecting selectively said distributor, reservoir, suspension elements and correcting means, said sliding member being controlled by a valve selector mechanism actuated by a hand lever and having a first position corresponding to an intermediate "road" position of the vehicle body and permitting an automatic control of said suspension elements by said vertical correcting means, a second position where said body is changed by an action of said hand lever to its raised end position, and a third position where said body is changed by action of said hand lever to its lowered position, wherein the relative positions of said valve ports and said sliding member are such that in said second position of said sliding member corresponding to the raised position of the vehicle body, one of said reduced diameter portions of the sliding member connects the port of the valve connected to the return of the vertical correcting means to the port of the valve connected to the rear suspension elements, and the second reduced diameter portion of said sliding member then connects the valve port connected to said fluid pressure distributor to the valve port connected to said front suspension elements.

2. A device according to claim 1, wherein the jacket of the valve body has a longitudinal orifice connected to the valve port connected to the fluid reservoir and to the bore in which said valve member slides, so that in said third position of the sliding member corresponding to the lowered position of the vehicle body the ports of the valve connected to said rear and front suspension elements are both connected to the fluid reservoir through the portions reduced diameter of the sliding member, through said longitudinal orifice and through said port connected to the reservoir.

3. A device according to claim 2, wherein said sliding member lies in respect to said fluid valves bottom on the highest level when in said third position corresponding to the lowest position of the vehicle body, on the lowest level when in said first "road" position and on an intermediate level when in said second position corresponding to the highest position of said body, the change from said first "road" position of said sliding member to said second position taking place without passing through said third position.